United States Patent
Poirier et al.

(10) Patent No.: US 9,840,678 B2
(45) Date of Patent: Dec. 12, 2017

(54) METHODS OF INHIBITING PRECIPITATION OF BIODIESEL FUEL COMPONENTS

(71) Applicants: Marc-Andre Poirier, Sarnia (CA); Alexander S. Lang, London (CA)

(72) Inventors: Marc-Andre Poirier, Sarnia (CA); Alexander S. Lang, London (CA)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 80 days.

(21) Appl. No.: 14/571,395

(22) Filed: Dec. 16, 2014

(65) Prior Publication Data
US 2015/0184101 A1 Jul. 2, 2015

Related U.S. Application Data

(60) Provisional application No. 61/920,799, filed on Dec. 26, 2013.

(51) Int. Cl.
*C10L 1/18* (2006.01)
*C10L 10/14* (2006.01)
(Continued)

(52) U.S. Cl.
CPC ............ *C10L 10/14* (2013.01); *C10L 1/026* (2013.01); *C10L 1/10* (2013.01); *C10L 1/146* (2013.01);
(Continued)

(58) Field of Classification Search
CPC ............... C10L 1/1881; C10L 1/1883; C10L 2200/0476
(Continued)

(56) References Cited

U.S. PATENT DOCUMENTS 6,409,778 B1 6/2002 Auschra et al.
7,964,000 B2 6/2011 Selvidge
(Continued)

FOREIGN PATENT DOCUMENTS

BR PI9804481 A 5/2000
CN 101082004 A 12/2007
(Continued)

OTHER PUBLICATIONS

Sern et al., "The effect of polymers and surfactants on the pour point of palm oil methyl esters", European Journal of Lipid Science and Technology, 2007, pp. 440-444, vol. 109, iss. 4, Wiley-VCH.
(Continued)

*Primary Examiner* — Ellen McAvoy
(74) *Attorney, Agent, or Firm* — Jamie L. Sullivan; Anthony G. Boone (57) ABSTRACT

Embodiments of the invention provide a method of inhibiting precipitation of biodiesel fuel components. The method includes providing a biodiesel fuel composition; providing a copolymer comprising at least first and second polymer units, said first polymer units derived from a carboxylic acid anhydride and said second polymer units derived from an olefin; and blending said copolymer with the biodiesel fuel to form a treated fuel composition. Alternatively, instead of the copolymer, a dialkylene glycol additive can be provided. Embodiments of the invention provide a method of reducing the cold soak filter blocking tendency of a biodiesel fuel composition.

2 Claims, 2 Drawing Sheets

(51) Int. Cl.
*C10L 1/10* (2006.01)
*C10L 1/02* (2006.01)
*C10L 1/14* (2006.01)
*C10L 1/185* (2006.01)
*C10L 1/19* (2006.01)
*C10L 1/196* (2006.01)
*C10L 1/198* (2006.01)
*C10L 1/16* (2006.01)
*C10L 1/182* (2006.01)
*C10L 1/2383* (2006.01)
*C10L 1/24* (2006.01)

(52) U.S. Cl.
CPC .......... *C10L 1/1966* (2013.01); *C10L 1/1608* (2013.01); *C10L 1/1616* (2013.01); *C10L 1/1824* (2013.01); *C10L 1/1852* (2013.01); *C10L 1/1855* (2013.01); *C10L 1/191* (2013.01); *C10L 1/1963* (2013.01); *C10L 1/1983* (2013.01); *C10L 1/2383* (2013.01); *C10L 1/2437* (2013.01); *C10L 1/2475* (2013.01); *C10L 2200/0476* (2013.01); *C10L 2230/20* (2013.01); *C10L 2250/04* (2013.01); *C10L 2290/24* (2013.01); *C10L 2300/20* (2013.01); *C10L 2300/30* (2013.01); *Y02E 50/13* (2013.01)

(58) Field of Classification Search
USPC .................................... 44/403, 404
See application file for complete search history.

(56) References Cited

U.S. PATENT DOCUMENTS

| | | | |
|---|---|---|---|
| 8,058,439 B2 | 11/2011 | Cox et al. | |
| 8,097,049 B2* | 1/2012 | Munson | B01D 15/00 210/670 |
| 8,236,069 B2* | 8/2012 | Martyak | C08F 293/005 44/397 |
| 8,298,303 B2* | 10/2012 | Jacob | C10L 1/026 44/445 |
| 8,709,109 B2* | 4/2014 | Kozyuk | C10L 1/026 44/385 |
| 8,871,961 B2* | 10/2014 | Seidel | C10L 1/026 210/194 |
| 8,945,644 B2* | 2/2015 | Gordon | B01F 5/0644 426/238 |
| 9,127,226 B2* | 9/2015 | O'Brien | C10L 1/1976 |
| 9,321,801 B2* | 4/2016 | Soe | C07J 17/005 |
| 2006/0003903 A1 | 1/2006 | Ooi et al. | |
| 2006/0173123 A1 | 8/2006 | Yang et al. | |
| 2006/0236598 A1* | 10/2006 | Selvidge | C10L 1/18 44/388 |
| 2007/0151146 A1 | 7/2007 | Lee et al. | |
| 2007/0161519 A1 | 7/2007 | Cravey et al. | |
| 2009/0064568 A1 | 3/2009 | Stohr et al. | |
| 2009/0235576 A1* | 9/2009 | Volkel | C10L 1/143 44/351 |
| 2009/0300975 A1 | 12/2009 | OBrien et al. | |
| 2010/0005706 A1 | 1/2010 | Burgazli et al. | |
| 2010/0005707 A1 | 1/2010 | Jacob | |
| 2010/0175310 A1 | 7/2010 | Martyak et al. | |
| 2011/0035994 A1* | 2/2011 | Sugiura | C10L 1/026 44/404 |
| 2011/0192076 A1 | 8/2011 | Hess et al. | |
| 2012/0021366 A1 | 1/2012 | Moller et al. | |
| 2012/0030994 A1 | 2/2012 | Sneddon | |
| 2013/0192124 A1* | 8/2013 | Arters | C10L 1/198 44/307 |
| 2014/0107380 A1* | 4/2014 | Bloom | C07C 41/09 568/679 |

FOREIGN PATENT DOCUMENTS

| | | |
|---|---|---|
| CN | 101760264 A | 6/2010 |
| CN | 102154038 A | 8/2011 |
| GB | 2071140 A1 | 9/1981 |
| JP | 2011122135 A2 | 6/2011 |
| KR | 100767766 B1 | 10/2007 |
| KR | 20100006061 A | 1/2010 |
| KR | 20110018396 A | 2/2011 |
| KR | 20110019585 A | 2/2011 |
| WO | 2010004872 A1 | 1/2010 |
| WO | 2011146289 A1 | 11/2011 |

OTHER PUBLICATIONS

Chen, et al., "Study on the effect of maleic anhydride-a-olefin copolymers and their esters on biodiesel pour point depression", Shengwuzhi Huaxue Gongcheng, May 2009, pp. 28-33, vol. 43, No. 3.

International Search Report and Written Opinion from PCT/US2014/070503 dated Mar. 9, 2015.

International Search Report and Written Opinion from PCT/US2014/070503 dated May 28, 2015.

* cited by examiner

METHODS OF INHIBITING PRECIPITATION OF BIODIESEL FUEL COMPONENTS

CROSS-REFERENCE TO RELATED APPLICATIONS

This application claims the benefit of provisional U.S. Ser. No. 61/920,799, filed Dec. 26, 2013, the entire contents of which are hereby incorporated by reference.

FIELD OF INVENTION

This invention involves improving the cold weather performance of biodiesel fuels. In particular, a method of reducing the cold soak filter blocking tendency of a biodiesel fuel.

BACKGROUND OF INVENTION

The use of renewable fuels, such as biodiesel, in motor vehicle fuels has grown considerably over the last few years due to the national and provincial mandates. Biodiesel is a fuel component made from plant or animal feedstocks through an esterification process. The resulting fatty acid alkyl esters have a large variation in cloud point depending upon their source and chemical composition. Such fuels also include therein sterol glucosides and saturated monoglycerides. For example, sterol glucosides impurities may be present in B100 grade biodiesel in the range from about 20 mg/kg to about 100 mg/kg. The presence of such compounds is believed to result in filter plugging in fuel systems, particularly in cold climate conditions. For instance, saturated monoglycerides have been found to precipitate above the cloud point of the biodiesel and, once precipitated, are not easily redissolved into the biofuel composition.

Because biodiesel fuels have these problems and the because the components, particularly in the case of monoglycerides, are difficult to effectively and economically remove from the biofuel, a method of treating the biofuel that reduces or eliminates the precipitation of such compounds in low temperature situations and thereby reduces or eliminates fuel filter plugging would be beneficial.

SUMMARY OF INVENTION

In one aspect, the invention can include a method of inhibiting precipitation of biodiesel fuel components, comprising: providing a biodiesel fuel composition; providing a copolymer comprising at least first and second polymer units, said first polymer units derived from a carboxylic acid anhydride and said second polymer units derived from an olefin; and blending said copolymer with the biodiesel fuel to form a treated fuel composition.

Additionally or alternatively, embodiments of the invention can relate to a method of reducing the Cold Soak Filter Blocking Tendency (CSFBT) of a biodiesel fuel composition. The method can comprise at least the following: providing a biodiesel fuel comprising one or more fatty acid esters; providing a copolymer comprising at least first and second polymer units, said first polymer units derived from a carboxylic acid anhydride and said second polymer units derived from an olefin; and blending said copolymer with the biodiesel fuel to form a treated fuel composition.

Further additionally or alternatively, embodiments of the invention can relate to a method of reducing the Cold Soak Filter Blocking Tendency (CSFBT) of a biodiesel fuel composition. The method can comprise at least the following: providing a biodiesel fuel comprising a biocomponent portion, optionally a non-biocomponent portion, and one or more solid forming compositions therein; providing a dialkylene glycol additive composition in an amount, relative to an amount of the biocomponent portion, of at least 0.7% volume/volume; and blending the additive with the biodiesel fuel to form a treated fuel composition.

DETAILED DESCRIPTION

For purposes herein an "olefin," alternatively referred to as "alkene," is a linear, branched, or cyclic compound comprising carbon and hydrogen having at least one polymerizable double bond. For purposes of this specification and the claims appended thereto, when a polymer or copolymer is referred to as comprising an olefin, the olefin present in such polymer or copolymer can typically be the polymerized form of the olefin, which can be called an olefin repeat unit, even if the defining double bond is polymerized. For example, when a copolymer is said to have a "comonomer" content of, for example, from about 35 wt % to about 55 wt %, it should be understood that the "mer" unit in the copolymer is derived from the copolymer in the polymerization reaction and said derived units are present in an amount from about 35% to about 55%, based upon the weight of the copolymer. A higher α-olefin is defined to be an alpha-olefin having 4 or more carbon atoms. For the purposes of this disclosure ethylene is considered an alpha-olefin.

For purposes herein a "polymer" has three or more of the same or different repeat, or "mer", units. A "homopolymer" is a polymer having "mer" units that are substantially all the same. A "copolymer" is a polymer having two or more "mer" units that are different from each other. A "terpolymer" is a polymer having three "mer" units that are different from each other. "Different" in reference to "mer" units indicates either an atomic difference (such that the chemical formulae are different and/or that the atoms are linked together in an arrangement where at least one atom is attached to the "mer" structure in a different manner) or an isomeric difference (such that the "mer" structures are isomers of each other and/or have different chiralities/structural handedness characteristics). Accordingly, the definition of copolymer, as used herein, includes terpolymers, quaterpolymers, and the like. An oligomer is typically a polymer having a low molecular weight (such a number average molecular weight (Mn) less than the entanglement molecular weight, e.g., depending on the polymer/oligomer, less than 20,000 g/mol, less than 15,000 g/mol, less than 10,000 g/mol, less than 7,500 g/mol, less than 5,000 g/mol, less than 2,500 g/mol, or less than 1,000 g/mol) and/or having a low number of mer/repeat units (such as 75 or less, 50 or less, 25 or less, 10 or less, or 5 or less; typically, though, an oligomer is distinct from a "dimer", which only has two "mer"/repeat units, such that it can contain three or more "mer"/repeat units).

As used herein, Mn represents number average molecular weight, Mw represents weight average molecular weight, and Mz represents z average molecular weight, wt % represents weight percent, and mol % represents mole percent. Molecular weight distribution (MWD), also referred to as polydispersity, is defined to be Mw divided by Mn. Unless otherwise noted, all molecular weight units herein (e.g., Mw, Mn, Mz) represent g/mol.

The terms "hydrocarbyl radical," "hydrocarbyl," "hydrocarbyl group," "alkyl radical," and "alkyl" are used interchangeably throughout this document. Likewise the terms "group", "radical", and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tertert-butyl, pentyl, iso-amyl, hexyl, octyl cyclopropyl, cyclobutyl, cyclopentyl, cyclohexyl, cyclooctyl, and the like including their substituted analogues.

The term "aryl" or "aryl group" means a six carbon aromatic ring and the substituted variants thereof. Aryl groups include heteroaryl groups wherein an aryl group includes one or more heteroatoms, such as N, O, and/or S in place of a ring carbon atom. As used herein, the term "aromatic" also refers to pseudoaromatic heterocycles which are heterocyclic substituents that have similar properties and structures (nearly planar) to aromatic heterocyclic ligands, but need not be, by definition, aromatic; likewise the term aromatic also refers to substituted aromatics.

Where isomers of a named alkyl or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

For purposes of this invention and claims thereto, the term "substituted" means that a hydrogen group has been replaced with a heteroatom, or a heteroatom containing group. For example, methyl-cyclopentadiene is substituted with a methyl group.

The terms "untreated biodiesel fuel composition" and "biodiesel fuel composition" refer to a biodiesel fuel composition lacking a copolymer as described herein.

The term "treated fuel composition" refers to the mixture resulting form the combination of an untreated biodiesel fuel composition and a copolymer described herein.

As used herein, the term "solid forming composition" means a composition that, with the passage of time and/or at a temperature of about 10° C. or less, forms a solid or gelatinous phase, as identified by optical inspection, in the presence of a remaining liquid portion of the biodiesel fuel composition.

The term "inhibiting precipitation" means that the amount of solid forming composition that separates from the liquid portion of a treated fuel composition is less than the amount of solid forming composition that separates from an untreated biodiesel fuel composition after soaking for about 16 hours at the same predetermined temperature. Alternatively, the term "inhibiting precipitation" means that CSFBT value or Fuel Filter Blocking Potential of a biodiesel fuel composition (before being mixed with a copolymer described herein) is higher than the CSFBT value or the Fuel Filter Blocking Potential after being mixed with the copolymer. In other words, "inhibiting precipitation occurs when the ratio of the CSFBT (or Fuel Filter Blocking Potential value) of the treated fuel composition to the CSFBT (or Fuel Filter Blocking Potential value) is less than 1.0, particularly less than about 0.95, less than about 0.80, less than about 0.70, less than about 0.60, less than about 0.50, or less than about 0.40.

As used herein, the term "ppm(v)" is interchangeable with "vppm" and refers to a concentration in parts per million based on volume.

Embodiments of the invention can include a method of inhibiting precipitation of biodiesel fuel components, which can thereby reduce fuel filter plugging, particularly in low temperature environments. The method can include: providing a biodiesel fuel composition; providing a copolymer comprising at least first and second polymer units, said first polymer units derived from a carboxylic acid anhydride and said second polymer units derived from an olefin; and blending said copolymer with the biodiesel fuel to form a treated fuel composition.

One way to determine that the formation of solids has been inhibited can be to measure the CSFBT of a biofuel composition. Thus, in some embodiments, the invention can include a method of reducing the CSFBT of a biodiesel fuel composition, comprising: providing a biodiesel fuel composition comprising one or more fatty acid esters; providing a copolymer comprising at least first and second polymer units, said first polymer units derived from a carboxylic acid anhydride and said second polymer units derived from an olefin; and blending said copolymer with the biodiesel fuel.

The copolymer comprising at least first and second polymer units for the methods according to the invention may be provided/combined by any suitable means. While the components (monomers/co-monomers) may be combined at any convenient temperature, in some embodiments, the components below can be combined at a temperature from about 20° C. to about 30° C. In some embodiments, the blending can occurs over a period from about 1 minute to about 30 minutes, but any convenient time period could be used.

In particular embodiments, a conductivity aid may also be included with the biofuel composition and the copolymer. The conductivity aid may be added separately to the mixture of the biofuel composition and copolymer or it may be premixed with either the biofuel composition or the copolymer, as may be convenient.

Additionally or alternately, in some embodiments, the invention can include a method of reducing the CSFBT of a biodiesel fuel composition, comprising: providing a biodiesel fuel comprising a biocomponent portion, optionally a non-biocomponent portion (e.g., a petroleum-based diesel portion, an artificially-made diesel portion such as a Fischer-Tropsch diesel portion, a shale oil diesel portion, an oil sands diesel portion, or the like, or a combination thereof), and one or more solid forming compositions therein; providing a dialkylene glycol additive composition in an amount, relative to an amount of the biocomponent portion, of at least 0.7% volume/volume; and blending the additive with the biodiesel fuel to form a treated fuel composition.

The methods described herein may further include determining a first CSFBT (CSFBT) value, wherein the first CSFBT value can advantageously be the CSFBT value for the untreated (i.e., no copolymer as described herein has been added) biodiesel fuel. The first CSFBT value can advantageously be at least about 1.0. The lower limit on the range of first CSFBT values may be selected from about 1.1, about 1.5, about 2.0, about 2.5, about 3.5, about 4.0, about 4.5, about 5.0, about 7.5, about 10, about 15, about 20, about 25, about 30, about 40, about 50, about 60, about 70, about 80, about 90, or about 100. The upper limit on the range of first CSFBT values may additionally or alternately be selected from about 1.1, about 1.5, about 2.0, about 2.5, about 3.5, about 4.0, about 4.5, about 5.0, about 7.5, about 10, about 15, about 20, about 25, about 30, about 40, about 50, about 60, about 70, about 80, about 90, or about 100. Ranges expressly disclosed include combinations of any of the above-enumerated upper and lower limits, e.g., from about 1.1 to about 100, from about 2.5 to about 10, from about 2.0 to about 20, or from about 2.0 to about 10.

In embodiments where the first CSFBT value is determined, the method may optionally but preferably further include determining a second CSFBT value, wherein the second CSFBT value can advantageously be the CSFBT value for the treated fuel composition. Typically, the second CSFBT value can be no more than about 5.0. The lower limit on the range of second CSFBT values may be selected from about 1.0, about 1.05, about 1.1, about 1.2, about 1.3, about 1.4, about 1.5, about 1.6, about 1.7, about 1.8, about 1.9, about 2.0, about 3.0, about 4.0, or about 5.0. The upper limit on the range of second CSFBT values may be selected from about 1.0, about 1.05, about 1.1, about 1.2, about 1.3, about 1.4, about 1.5, about 1.6, about 1.7, about 1.8, about 1.9, about 2.0, about 3.0, about 4.0, or about 5.0. Ranges expressly disclosed include combinations of any of the above-enumerated upper and lower limits; e.g., from about 1.0 to about 5.0, from about 1.05 to about 1.2, from about 2.0 to about 5.0, or from about 1.0 to about 3.0. In particular embodiments, the second CSFBT value can be from about 1.0 to about 2.0, from about 1.0 to about 1.5, from about 1.0 to about 1.3, or from about 1.0 to about 1.1.

Optionally but preferably in cases where two CSFBT values are determined, the methods described herein may include determining the ratio of the first and second CSFBT values. Generally, the ratio of the second CSFBT value to the first CSFBT value can be no more than about 0.95. The lower limit on the range of ratio of the second CSFBT value to the first CSFBT value may be selected from about 0.01, about 0.02, about 0.03, about 0.04, about 0.05, about 0.06, about 0.07, about 0.08, about 0.09, about 0.10, about 0.20, about 0.30, about 0.40, about 0.50, about 0.60, about 0.70, about 0.80, about 0.90, or about 0.95. The upper limit on the range of ratio of the second CSFBT value to the first CSFBT value may be selected from about 0.01, about 0.02, about 0.03, about 0.04, about 0.05, about 0.06, about 0.07, about 0.08, about 0.09, about 0.10, about 0.20, about 0.30, about 0.40, about 0.50, about 0.60, about 0.70, about 0.80, about 0.90, or about 0.95. Ranges expressly disclosed include combinations of any of the above-enumerated upper and lower limits. In particular embodiments, the ratio of the second CSFBT value to the first CSFBT value can be from about 0.01 to about 0.95, from about 0.01 to about 0.5, from about 0.01 to about 0.1, from about 0.30 to about 0.70, from about 0.40 to about 0.60, or from about 0.01 to about 0.05.

The Biodiesel Fuel

Typically, the biodiesel fuel of the methods described herein can include one or more fatty acid esters, e.g., fatty acid $C_1$-$C_4$ alkyl esters such as fatty acid methyl esters and/or fatty acid ethyl esters. In some embodiments, the biodiesel fuel composition may include vegetable fats/oils, animal fats/oils, fish oils, oils/biomass extracted from fungus/bacteria, and algae lipids/oils, as well as separated portions of such materials. Examples of vegetable oils that can be used in accordance with this invention can include, but are not limited to, rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, cuphera oil, babassu oil, tallow oil, and rice bran oil. In some embodiments of the processes of the methods described herein, coconut, cuphera, and babassu oils can be preferred, particularly in circumstances where the dewaxing process is desired to predominantly cause isomerization and to cause minimal cracking (e.g., because their raw product contains relatively shorter carbon number chains than many other such oils). Thus, in additional or alternative embodiments, the biodiesel fuel may be deoxygenated or dewaxed as may be known in the art. Some suitable biodiesel fuels are obtainable by transesterification of fats or vegetable oils, tallow oil, used cooking oil with an alcohol, e.g., a $C_1$-$C_4$ alcohol such as methanol and/or ethanol. In one embodiment, the fatty acid esters can be largely unsaturated and can comprise rapeseed alkyl(methyl)ester, canola alkyl(methyl)ester, soybean alkyl(methyl)ester, corn alkyl(methyl)ester, or a mixture thereof.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui,* and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Pichochlorum, Pseudoneochloris, Pseudostaurastrum, Platymonas, Pleurochrysis, Pleurococcus, Prototheca, Pseudochlorella, Pyramimonas, Pyrobotrys, Scenedesmus, Schizochlamydella, Skeletonema, Spyrogyra, Stichococcus, Tetrachlorella, Tetraselmis, Thalassiosira, Tribonema, Vaucheria, Viridiella,* and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema,* and *Xenococcus* species.

As described above, such biofuel sources typically include components that precipitate from biodiesel fuels at low temperatures. For example, fatty acid methyl esters can typically contain from about 20 mg/kg to about 60 mg/kg of sterol glucosides and from about 100 mg/kg to about 8000 mg/kg of total monoglycerides.

Typically, it is believed that the presence of such sterol glucosides and/or monoglycerides can result in a relatively high CSFBT value. Thus, biodiesel fuel compositions described herein can typically have a (first) CSFBT greater than 1.0, particularly greater than about 1.2, greater than about 1.4, greater than about 1.6, greater than about 1.8, greater than about 2.0, greater than about 2.2, or greater than about 2.4. In some embodiments, the lower limit of the range of the biodiesel fuel (first) CSFBT may be about 1.1, about 1.2, about 1.3, about 1.4, about 1.5, about 1.6, about 1.7, about 1.8, about 1.9, about 2.0, about 2.1, about 2.1, about 2.2, about 2.3, about 2.4, about 2.5, about 2.6, about 2.7, about 2.8, about 2.9, or about 3.0. Exemplary upper limits of the range of the biodiesel fuel composition (first) CSFBT include about 1.1, about 1.2, about 1.3, about 1.4, about 1.5, about 1.6, about 1.7, about 1.8, about 1.9, about 2.0, about 2.1, about 2.1, about 2.2, about 2.3, about 2.4, about 2.5, about 2.6, about 2.7, about 2.8, about 2.9, or about 3.0. Exemplary ranges of (first) CSFBT values for the biodiesel fuel composition may include any lower and any upper limit, e.g., from about 1.2 to about 2.5, from about 1.4 to about 2.6, from about 1.3 to about 2.3, from about 2.0 to about 2.4, from about 2.2 to about 2.7, etc. Particular (first) CSFBT values may be in the range from about 1.2 to about 3.0, from about 1.2 to about 2.8, from about 1.2 to about 2.6, from about 1.2 to about 2.4, or from about 1.2 to about 2.0. Additionally or alternatively, the biodiesel fuel composition may have a (first) CSFBT value of from about 1.2 to about 3.0, from about 1.4 to about 3.0, from about 1.6 to about 3.0, from about 1.8 to about 3.0, or from about 2.0 to about 3.0.

Additionally or alternatively, the biodiesel fuel component may be a B100 biodiesel fuel. Particular components of such biodiesel fuels are described in ASTM D6751-12, the disclosure of which is incorporated herein in its entirety. One such B100 grade, designated S15, is described as a biodiesel blendstock intended for use in middle distillate fuel applications, which can be sensitive to the presence of partially reacted glycerides and can have a maximum sulfur content of ~15 wppm (ppm by weight). Another such biofuel component, designated S500, is described as a biodiesel blendstock intended for use in middle distillate fuel applications, which can be sensitive to the presence of partially reacted glycerides and can have a maximum sulfur content of ~500 wppm.

In some embodiments the biodiesel fuel composition may be a B6-B20 biodiesel, i.e., a ~6 vol % to ~20 vol % biodiesel with the remainder being a light middle or middle distillate diesel fuel, conforming to the requirements of Specification ASTM D6751, the disclosure of which is incorporated herein by reference in its entirety. In particular embodiments, the B6-B20 biodiesel may have a maximum sulfur content of about 15 wppm to about 5000 wppm, for example of about 15 wppm to about 500 wppm or of about 500 wppm to about 5000 wppm.

In certain embodiments, the biodiesel fuel may advantageously be derived predominantly (more than 50% by weight, e.g., more than 60% by weight, more than 70% by weight, more than 80% by weight, more than 90% by weight, more than 95% by weight, or more than 99% by weight) or completely from triglycerides and/or fatty acid components. Triglycerides, as used herein, can be represented as glycerol transesterified with three fatty acids, which are carboxylic acid heads attached to hydrocarbon acyl tails/chains. However, in some embodiments, triglycerides can include mono- and/or di-substituted versions of glycerol, as well as tri-substituted glycerol. It should be understood that fatty acids are described in terms of how many carbons on their molecule, which is one more than the number of carbons in their acyl chains (as the carboxylic acid carbon is not counted in the acyl chain but is still part of the molecule). Thus, a fatty acid having 14 carbons has an acyl chain with 13 carbons attached to a carboxylic acid (or ion or salt). Further, glycerides can be defined in the same manner—where a triglyceride has three chains of 14 carbons attached via an ester linkage to glycerol, the triglyceride can be said to have acyl chains with 13 carbons as well as the ester carbon (which would be a carboxylic acid/carboxylate ion/salt carbon, if disconnected from the glycerol).

Additionally or alternatively, the biodiesel fuel can exhibit an isoparaffin to normal paraffin ratio from about 2:1 to about 6:1, e.g., from about 2:1 to about 5:1, from about 2:1 to about 4:1, from about 2:1 to about 3:1, from about 3:1 to about 6:1, from about 3:1 to about 5:1, from about 3:1 to about 4:1, from about 4:1 to about 6:1 from about 4:1 to about 5:1, or from about 5:1 to about 6:1. Further additionally or alternatively, the biodiesel fuel can exhibit an aromatics content less than about 5 vol %, e.g., less than about 4 vol %, less than about 3 vol %, less than about 2 vol %, less than about 1 vol %, less than about 0.7 vol %, less than about 0.5 vol %, less than about 0.3 vol %, less than about 0.1 vol %, or less than about 0.05 vol %. Still further additionally or alternatively, biodiesel fuel can exhibit an olefin (unsaturated double bond) content less than about 1.5% by weight, e.g., less than about 1.2% by weight, less than about 1% by weight, less than about 0.8% by weight, less than about 0.7% by weight, less than about 0.6% by weight, less than about 0.5% by weight, less than about 0.4% by weight, less than about 0.3% by weight, less than about 0.2% by weight, or less than about 0.1% by weight.

In certain embodiments, at least 80% of the acyl chains (on both the triglycerides and fatty acids/ions/salts, if both are present) can have from 7 to 17 carbons, e.g., from 7 to 15 carbons, from 7 to 13 carbons, from 7 to 11 carbons, from 9 to 17 carbons, from 9 to 15 carbons, from 9 to 13 carbons, or from 9 to 11 carbons. Additionally or alternatively, at least 85% of the acyl chains can have from 7 to 17 carbons, e.g., from 7 to 15 carbons, from 7 to 13 carbons, from 7 to 11 carbons, from 9 to 17 carbons, from 9 to 15 carbons, from 9 to 13 carbons, or from 9 to 11 carbons. Alternatively, at least 90% of the acyl chains can have from 7 to 17 carbons, e.g., from 7 to 15 carbons, from 7 to 13 carbons, from 7 to 11 carbons, from 9 to 17 carbons, from 9 to 15 carbons, from 9 to 13 carbons, or from 9 to 11 carbons. Further additionally or alternatively, at least 95% of the acyl chains can have from 7 to 17 carbons, e.g., from 7 to 15 carbons, from 7 to 13 carbons, from 7 to 11 carbons, from 9 to 17 carbons, from 9 to 15 carbons, from 9 to 13 carbons, or from 9 to 11 carbons. Still further additionally or alternatively, at least 98% of the acyl chains can have from 7 to 17 carbons, e.g., from 7 to 15 carbons, from 7 to 13 carbons, from 7 to 11 carbons, from 9 to 17 carbons, from 9 to 15 carbons, from 9 to 13 carbons, or from 9 to 11 carbons. Yet further additionally or alternatively, at least 99% (and/or substantially all) of the acyl chains can have from 7 to 17 carbons, e.g., from 7 to 15 carbons, from 7 to 13 carbons, from 7 to 11 carbons, from 9 to 17 carbons, from 9 to 15 carbons, from 9 to 13 carbons, or from 9 to 11 carbons.

Other biodiesel fuel compositions and blends thereof that may be suitable for use in this invention are described in U.S. Patent Application Publication No. 2011/0192076, the disclosure of which is incorporated herein by reference in its entirety.

In particular embodiments, the fuel composition can advantageously be substantially free of one or more polyamine compositions. As used herein with respect to polyamines, the term "substantially free" means that the biodiesel fuel composition includes less than 1.0 wt %, less than 0.5 wt %, less than 0.1 wt %, less than 0.05 wt %, or less than 0.01 wt % of one or more polyamines, based on the total weight of the biofuel composition, or even include completely no polyamines and/or no detectable polyamines. Additionally or alternatively, the term "substantially free" can mean that a polyamine is not purposely added to or formed in the biodiesel fuel composition.

The Copolymer Component

Embodiments of the invention described herein include providing a copolymer. The copolymer is typically provided in an amount sufficient to achieve a copolymer content, based on the total weight of the biodiesel fuel composition, the copolymer and the continuity aid (when present), from about $1.0 \times 10^1$ vppm to about $1.0 \times 10^4$ vppm. The lower limit on the amount of copolymer, based on the total weight of the biodiesel fuel composition, the copolymer, and any additive(s), may be selected from about 10 ppm(v), about 25 ppm(v), about 50 ppm(v), about 75 ppm(v), about 100 ppm(v), about 125 ppm(v), about 250 ppm(v), about 375 ppm(v), about 500 ppm(v), about 750 ppm(v), about 1000 ppm(v), about 2500 ppm(v), about 5000 ppm(v), about 7500 ppm(v), or about 10000 ppm(v). The upper limit on the amount of copolymer may be selected from about 10 ppm(v), about 25 ppm(v), about 50 ppm(v), about 75 ppm(v), about 100 ppm(v), about 125 ppm(v), about 250 ppm(v), about 375 ppm(v), about 500 ppm(v), about 750 ppm(v), about 1000 ppm(v), about 2500 ppm(v), about 5000 ppm(v), about 7500 ppm(v), or about 10000 ppm(v). Ranges expressly disclosed include combinations of any of the above-enumerated upper and lower limits; e.g., from about 25 ppm(v) to about 750 ppm(v), from about 375 ppm(v) to about 1000 ppm(v), from about 100 ppm(v) to about 500 ppm(v), or from about 375 ppm(v) to about 2500 ppm(v). In particular embodiments, the copolymer can be present at a concentration of about 50 ppm(v) to about 2000 ppm(v), of about 1000 ppm(v) to about 2000 ppm(v), or of about 100 ppm(v) to about 300 ppm(v).

Copolymers useful in embodiments of the invention can include copolymers comprising at least first and second polymer units, said first polymer units derived from a carboxylic acid anhydride and said second polymer units derived from an olefins. Typically, such copolymers can have a weight average molecular weight, $M_w$, in a range from about 2,000 g/mol to about 50,000 g/mol.

Monomers useful herein to provide the first polymer units can be derived from a linear or branched, substituted or unsubstituted $C_2$-$C_{20}$ aliphatic, cyclic, or aromatic anhydride. In particular embodiments, the first polymer units can be derived from a linear or branched, substituted or unsubstituted $C_2$ to $C_{12}$ aliphatic, cyclic, or aromatic anhydride. In other embodiments, the first polymer units can be derived from a linear or branched, substituted or unsubstituted $C_2$ to $C_{10}$ aliphatic, cyclic, or aromatic anhydride, or a linear or branched, substituted or unsubstituted $C_4$ to $C_9$ aliphatic, cyclic, or aromatic anhydride. Exemplary carboxylic acid anhydrides from which the second polymer units may be derived can include, but are not limited to, maleic anhydride, succinic anhydride, glutaric anhydride, tetrapropylene succinic anhydride, phthalic anhydride, trimellitic anhydride, and combinations or mixtures thereof.

Monomers useful herein to provide the second monomer units of the copolymer can include substituted or unsubstituted $C_2$ to $C_{70}$ olefins, particularly $C_2$ to $C_{40}$ alpha-olefins, $C_2$ to $C_{20}$ alpha-olefins, or $C_2$ to $C_{12}$ alpha-olefins (e.g., ethylene, propylene, butene, pentene, hexene, heptene, octene, nonene, decene, undecene, dodecane, and isomers and oligomers thereof). In particular embodiments, the second polymer units can be derived from ethylene, propylene, 1-butene, or oligomers thereof. The $C_2$ to $C_{70}$ olefin monomers may be linear, branched, or cyclic and may optionally include one or more heteroatoms and/or one or more functional groups.

Exemplary $C_2$ to $C_{40}$ olefin monomers and optional comonomers can include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, for instance, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Exemplary copolymers may be formed by reaction between maleic anhydride and an alpha-olefin. Reacting ~4 moles of propylene with one mole of succinic anhydride gives tetrapropylene succinic anhydride. Another useful copolymer can be formed by a ~1:1 stoichiometric addition of maleic anhydride and polyisobutylene. The resulting product can have an Mw range higher than about 2,000 g/mol independently up to about 10,000 g/mol, alternatively from about 2,500 g/mol to about 10,000 g/mol and/or from about 2,700 g/mol to about 8,000 g/mol.

More specific examples can include, but are not necessarily limited to, copolymers made by the reaction of maleic and/or succinic anhydride with $C_6$ to $C_{50}$ alpha-olefins, for instance, 1-octene, 1-dodecene, and/or 1-hexadecene. In more specific non-limiting embodiments, the alpha olefins may range from $C_{20}$-$C_{24}$, alternatively $C_{26}$-$C_{32}$. A copolymer made by reacting maleic anhydride with polyisobutylene can additionally or alternatively be a copolymer of interest, a particularly suitable example of which is commercially available from Baker Hughes and identified as BPR34260H. Additional information regarding useful copolymers may be found in U.S. Pat. No. 8,058,493, the disclosure of which is hereby incorporated in its entirety.

The Dialkylene Glycol Component

The dialkylene glycol additive can comprise or be diethylene glycol and/or dipropylene glycol. Dipropylene glycol should be understood to comprise one or more of the following isomers: 4-oxa-1,7-heptane-diol (di-n-propylene glycol), 4-oxa-2,6-heptanediol (bis-2-hydroxypropyl ether), and 2,2'-oxydipropanol. Advantageously, the dialkylene glycol additive can be present in proportion to the biocomponent portion of the biodiesel fuel of at least 0.7% volume/volume, e.g., at least 0.8% v/v, at least 0.9% v/v, or at least 1.0% v/v. Additionally or alternately, the dialkylene glycol additive can be present in proportion to the biocomponent portion of the biodiesel fuel of at most 20.0% volume/volume, e.g., at most 10.0% v/v or at most 5.0% v/v.

Conductivity Aid

In some embodiments, the methods described herein further include providing a conductivity aid. Conductivity aids are also sometimes referred to as anti-static agents. The continuity aid, when present, can typically be provided in an amount sufficient to achieve a conductivity aid content, based on the total weight of the biodiesel fuel composition, the copolymer, and the conductivity aid, of at least about 1.0 ppm(v), particularly at least about 1.5 ppm(v), at least about 2.0 ppm(v), at least about 2.5 ppm(v), at least about 3.0 ppm(v), at least about 3.5 ppm(v), at least about 4.0 ppm(v), or at least about 5.0 ppm(v). In one exemplary range, the concentration of conductivity aid can be from about 1.0 ppm(v) to about 100 ppm(v). In particular embodiments, the lower limit on the amount of conductivity aid, based on the total weight of the biodiesel fuel composition, the copolymer, and the conductivity aid, may be selected from about 1.0 ppm(v), about 1.5 ppm(v), about 2.0 ppm(v), about 2.5 ppm(v), about 3.0 ppm(v), about 4.0 ppm(v), about 5.0 ppm(v), about 6.0 ppm(v), about 10 ppm(v), about 12.5 ppm(v), about 15 ppm(v), about 20 ppm(v), about 25 ppm(v), about 50 ppm(v), about 75 ppm(v), or about 100 ppm(v). Additionally or alternatively, the upper limit on the amount of copolymer may be selected from 1 about 1.0 ppm(v), about 1.5 ppm(v), about 2.0 ppm(v), about 2.5 ppm(v), about 3.0 ppm(v), about 4.0 ppm(v), about 5.0 ppm(v), about 6.0 ppm(v), about 10 ppm(v), about 12.5 ppm(v), about 15 ppm(v), about 20 ppm(v), about 25 ppm(v), about 50 ppm(v), about 75 ppm(v), or about 100 ppm(v). Ranges expressly disclosed include combinations of any of the above-enumerated upper and lower limits; e.g., from about 1.0 ppm(v) to about 10 ppm(v), from about 3.0 ppm(v) to about 12.5 ppm(v), from about 2.0 ppm(v) to about 100 ppm(v), or from about 75 ppm(v) to about 100 ppm(v).

In some embodiments, the conductivity aid can comprise a polysulfone copolymer, a polymeric polyamine, and/or an oil-soluble sulfonic acid. As desired, the conductivity aid may comprise two or more components selected from the above components and may optionally additionally include a solvent, such as those available commercially from Innospec under one or more of the tradenames Stadis™ and Octastat™.

Some exemplary (commercially available) conductivity aids can include about 30 wt % to about 60 wt % of a first aromatic hydrocarbon solvent (e.g., toluene); about 10 wt % to about 30 wt % of a heavy aromatic solvent (e.g., naphtha); about 10 wt % to about 30 wt % of a sulfonic acid (e.g., dinonylnaphthylsulphonic acid); about 10 wt % to about 30 wt % of a sulfur-containing polymer; about 5.0 wt % to about 10 wt % of a nitrogen-containing polymer; about 1.0 wt % to about 5.0 wt % of an alcohol (e.g., 2-propanol); and about 1.0 wt % to about 5.0 wt % of a second aromatic hydrocarbon solvent (e.g., naphthalene). One such conductivity aid is commercially available from Innospec under the tradename Stadis™ 450. Other commercially available conductivity aids can include Octastat™ 3000, Stadis™ 425, and/or Octastat™ 2000.

Treated Fuel Composition

In some embodiments, the treated fuel composition can comprise a biodiesel fuel composition and a carboxylic acid anhydride copolymer as described herein. In other embodiments, the treated fuel composition can comprise a biodiesel fuel composition and a dialkylene glycol additive as described herein. In particular embodiments, the treated fuel composition can have a (second) CSFBT value no greater than about 5.0. The lower limit on the range of (second) CSFBT of the treated fuel composition may be selected from about 1.0, about 1.05, about 1.1, about 1.2, about 1.3, about 1.4, about 1.5, about 1.6, about 1.7, about 1.8, about 1.9, about 2.0, about 3.0, about 4.0, about 3.0, or about 5.0. The upper limit on the range of (second) CSFBT for the treated fuel composition may be selected from about 1.0, about 1.05, about 1.1, about 1.2, about 1.3, about 1.4, about 1.5, about 1.6, about 1.7, about 1.8, about 1.9, about 2.0, about 3.0, about 4.0, about 3.0, or about 5.0. Ranges expressly disclosed include combinations of any of the above-enumerated upper and lower limits; e.g., from about 1.0 to about 5.0, from about 1.05 to about 1.2, from about 2.0 to about 5.0, or from about 1.0 to about 3.0. In particular embodiments, the (second) CSFBT value can be from about 1.0 to about 2.0, from about 1.0 to about 1.5, from about 1.0 to about 1.3, or from about 1.0 to about 1.1.

The treated fuel composition may have a (second) CSFBT value such that the ratio of the (first) CSFBT value of the biodiesel to the (second) CSFBT value of the treated fuel composition is no greater than about 0.95. The lower limit on the range of this ratio for the treated fuel composition may be selected from about 0.01, about 0.02, about 0.03, about 0.04, about 0.05, about 0.06, about 0.07, about 0.08, about 0.09, about 0.10, about 0.20, about 0.30, about 0.40, about 0.50, about 0.60, about 0.70, about 0.80, about 0.90, or about 0.95. The upper limit on the range of the ratio may be selected from about 0.01, about 0.02, about 0.03, about 0.04, about 0.05, about 0.06, about 0.07, about 0.08, about 0.09, about 0.10, about 0.20, about 0.30, about 0.40, about 0.50, about 0.60, about 0.70, about 0.80, about 0.90, or about 0.95. Ranges expressly disclosed include combinations of any of the above-enumerated upper and lower limits. In particular embodiments the ratio of the second CSFBT value to the first CSFBT value can be from about 0.01 to about 0.95, particularly from about 0.01 to about 0.5, from about 0.01 to about 0.1, from about 0.30 to about 0.70, from about 0.40 to about 0.60, or from about 0.01 to about 0.05.

Additionally or alternatively, treated biofuel compositions herein may have a Fuel Filter Blocking Potential determined according to ASTM D 7501 of less than about 200 seconds. The lower limit on the range of Fuel Filter Blocking Potential values may be selected from about 5.0 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, about 70.0 seconds, about 75 seconds, about 80 seconds, about 85 seconds, about 90 seconds, about 95.0 seconds, about 100 seconds, about 110 seconds, about 120 seconds, about 130 seconds, about 140 seconds, about 150 seconds, about 160 seconds, 170 seconds, about 180 seconds, about 190 seconds, about 195 seconds, and about 199 seconds. The upper limit on the Fuel Filter Blocking Potential may be selected from about 5.0 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, about 70.0 seconds, about 75 seconds, about 80 seconds, about 85 seconds, about 90 seconds, about 95.0 seconds, about 100 seconds, about 110 seconds, about 120 seconds, about 130 seconds, about 140 seconds, about 150 seconds, about 160 seconds, 170 seconds, about 180 seconds, about 190 seconds, about 195 seconds, and about 199 seconds. Ranges expressly disclosed include combinations of any of the above-enumerated upper and lower limits, e.g., from about 5.0 seconds to about 190 seconds, from about 100 seconds to about 150 seconds, from about 70 seconds to about 140 seconds, etc.

In some non-limiting embodiments, the treated biofuel composition may have one or more of the following properties: a combined calcium and magnesium content, according to EN 14538, of less than about 5 ppm (µg/g), less than about 4.0 ppm, less than about 3.0 ppm, less than about 2.0 ppm, or less than about 1.0 ppm; a Flash Point (closed cup), according to ASTM D 93, of more than about 93° C., e.g., from about 93° C. to about 150° C., from about 95° C. to about 150° C., from about 100° C. to about 150° C., from about 105° C. to about 150° C., from about 110° C. to about 150° C., from about 120° C. to about 150° C., from about 125° C. to about 150° C., or from about 130° C. to about 150° C.; a methanol content, according to EN 14110, of no more than about 0.2 mass %, particularly from about 0.01 mass % to about 0.2 mass %, from about 0.05 to about 0.18 mass %, from about 0.05 to about 0.16 mass %, from about 0.05 to about 0.14 mass %, from about 0.05 to about 0.12 mass %, or from about 0.05 to about 0.10 mass %; a water and sediment content, according to ASTM D 2709, of less than about 0.05 vol %, particularly less than about 0.04 vol %, less than about 0.35 vol %, less than about 0.30 vol %, less than about 0.25 vol %, less than about 0.20 vol %, less than about 0.15 vol %, or less than about 0.10 vol %; a Kinematic Viscosity at ~40° C., according to ASTM D 445, from about 1.9 to about 6.0 mm$^2$/sec; particularly from about 1.9 to about 5.5 mm$^2$/sec, from about 1.9 to about 5.0 mm$^2$/sec, from about 1.9 to about 4.5 mm$^2$/sec, from about 1.9 to about 4.0 mm$^2$/sec, from about 1.9 to about 3.5 mm$^2$/sec, from about 2.0 to about 6.0 mm$^2$/sec, from about 2.5 to about 5.5 mm$^2$/sec, from about 3.0 to about 5.5 mm$^2$/sec, from about 3.5 to about 6.0 mm$^2$/sec, from about 3.5 to about 5.0 mm$^2$/sec, or from about 4.0 to about 6.0 mm$^2$/sec.

Particular Embodiments

Additionally or alternately, the present invention can include one or more of the following embodiments.

Embodiment 1

A method of inhibiting precipitation of biodiesel fuel components, comprising: providing a biodiesel fuel composition; providing a copolymer comprising at least first and second polymer units, said first polymer units derived from a carboxylic acid anhydride and said second polymer units derived from an olefin; and blending said copolymer with the biodiesel fuel to form a treated fuel composition.

Embodiment 2

A method of reducing the cold soak filter blocking tendency of a biodiesel fuel composition, comprising: providing a biodiesel fuel comprising one or more solid forming compositions therein; providing a copolymer comprising at least first and second polymer units, said first polymer units derived from a carboxylic acid anhydride and said second polymer units derived from an olefin; and blending said copolymer with the biodiesel fuel to form a treated fuel composition.

Embodiment 3

A method of reducing the cold soak filter blocking tendency of a biodiesel fuel composition, comprising: providing a biodiesel fuel comprising a biocomponent portion, optionally a non-biocomponent portion, and one or more solid forming compositions therein; providing a dialkylene glycol additive composition in an amount, relative to an amount of the biocomponent portion, of at least 0.7% volume/volume (e.g., at least 0.8% v/v, at least 0.9% v/v, or at least 1.0% v/v; optionally at most 20.0% v/v, for example at most 10.0% v/v or at most 5.0% v/v); and blending the additive with the biodiesel fuel to form a treated fuel composition.

Embodiment 4

The method of Embodiment 2 of Embodiment 3, wherein the one or more solid forming compositions include one or more sterol glucosides and/or one or more monoglycerides.

Embodiment 5

The method of any one of the previous Embodiments, wherein the biodiesel fuel composition comprises a non-zero amount up to about 200 mg/kg, for example from about 10 mg/kg to about 100 mg/kg or from about 20 mg/kg to about 60 mg/kg, of one or more sterol glucosides.

Embodiment 6

The method of any one of the previous Embodiments, wherein the biodiesel fuel composition comprises a non-zero amount up to about 20,000 mg/kg, for example from about 50 mg/kg to about 10,000 mg/kg or from about 100 mg/kg to about 8,000 mg/kg, of monoglycerides.

Embodiment 7

The method of any one of Embodiments 1-2 and 4-6, wherein the first polymer units are derived from an linear or branched, substituted or unsubstituted $C_2$-$C_{20}$ aliphatic, cyclic, or aromatic anhydride.

Embodiment 8

The method of any one of Embodiments 1-2 and 4-6, wherein the first polymer units are derived from maleic anhydride, succinic anhydride, glutaric anhydride, tetrapropylene succinic anhydride, phthalic anhydride, trimellitic anhydride.

Embodiment 9

The method of any one of Embodiments 1-2 and 4-8, wherein the second polymer units are derived from a $C_2$-$C_{70}$ olefin, for example a $C_2$ to $C_{40}$ alpha-olefin, a $C_2$ to $C_{20}$ alpha-olefin, and/or a $C_2$ to $C_{12}$ alpha-olefin.

Embodiment 10

The method of any one of Embodiments 1-2 and 4-9, wherein the second polymer units are derived from ethylene, propylene, and/or a butylene.

Embodiment 11

The method of any one of Embodiments 1-2 and 4-10, wherein providing a copolymer includes providing the copolymer in an amount from about 10 ppm(v) to about 10000 ppm(v), for example from about 25 ppm(v) to about 750 ppm(v), from about 375 ppm(v) to about 1000 ppm(v), from about 100 ppm(v) to about 500 ppm(v), from about 375 ppm(v) to about 2500 ppm(v), from about 50 ppm(v) to about 2000 ppm(v), from about 1000 ppm(v) to about 2000 ppm(v), or from about 100 ppm(v) to about 300 ppm(v), based on the total volume of the biodiesel fuel composition.

Embodiment 12

The method of any one of the previous Embodiments, wherein the treated fuel composition is substantially free of one or more polyamine compositions, particularly wherein the fuel compositions comprise less than about 1.0 wt %, less than about 0.5 wt %, less than about 0.1 wt %, less than about 0.05 wt %, or less than about 0.01 wt % of one or more polyamines, based on the total weight of the biofuel composition.

Embodiment 13

The method of any one of the previous Embodiments, further including determining a first CSFBT value, wherein the first CSFBT value is the CSFBT value for the biodiesel fuel.

Embodiment 14

The method of Embodiment 12, wherein the first CSFBT value is from about 1.1 to about 100, for example from about 2.0 to about 100, from about 2.0 to about 20, from about 2.0 to about 10, from about 1.1 to about 3.0, from about 1.2 to about 3.0, from about 1.2 to about 2.8, from about 1.2 to about 2.6, from about 1.2 to about 2.4, from about 1.2 to about 2.0, from about 1.4 to about 3.0, from about 1.6 to about 3.0, from about 1.8 to about 3.0, or from about 2.0 to about 3.0.

Embodiment 15

The method of Embodiment 12 or Embodiment 13, further including determining a second CSFBT value, wherein the second CSFBT value is the CSFBT value for the treated fuel composition.

Embodiment 16

The method of Embodiment 14, wherein the second CSFBT value is from about 1.0 to about 5.0, for example from about 1.0 to about 2.0, from about 1.0 to about 1.5, from about 1.0 to about 1.3, or from about 1.0 to about 1.1.

Embodiment 17

The method of Embodiment 14 or Embodiment 15, wherein the ratio of the second CSFBT value to the first CSFBT value is from about 0.01 to about 0.95, for example from about 0.01 to about 0.5, from about 0.01 to about 0.1, from about 0.30 to about 0.70, from about 0.40 to about 0.60, or from about 0.01 to about 0.05.

Embodiment 18

The method of any one of Embodiments 3-6 and 12-17, wherein one or more of the following are satisfied: the dialkylene glycol additive comprises or is diethylene glycol and/or dipropylene glycol; the dialkylene glycol additive is present in an amount, relative to an amount of the biocomponent portion, of at least 1.0% v/v; the dialkylene glycol additive is present in an amount, relative to an amount of the biocomponent portion, of at most 20.0% v/v; the one or more solid forming compositions comprises a non-zero amount up to 200 mg/kg of one or more sterol glucosides; the one or more solid forming compositions comprises a non-zero amount up to 20000 mg/kg of one or more monoglycerides; the biodiesel fuel without the additive composition has a CSFBT of at least about 1.4; and the treated fuel composition with the additive composition has a CSFBT from about 1.0 to about 1.3.

EXAMPLES

Test Methods

Molecular Weights and Molecular Weight Distribution (MWD):

As used in the Examples, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Generally, the values for Mn, Mw, and Mz can be supplied by the manufacturer. Nevertheless, further details regarding their determination, e.g., by GPC, may be found, among other places, in U.S. Patent Application Publication No. 2006/0173123, such as at page 24-25, paragraphs [0334] to [0341]. All molecular weight units (e.g., Mw, Mn, Mz) are in g/mol.

Fuel Filter Blocking Potential can be determined via ASTM D 7501.

Cold Soak Filter Blocking Tendency (CSFBT):

The sample can be cold soaked according to ASTM D 7501 for about 16 hours at ~1° C. and then brought to ambient temperature. Cold soaking can cause undesired components such as fatty acid alkyl esters to precipitate. The Filter Blocking Tendency (FBT) can then be determined according to ASTM D 2068 using Procedure B modified (Whatman Puradisc™ ~13 mm diameter GF/A ~1.6 μm glass microfibre syringe filter).

Experimental

Example 1

In this Example, a canola oil methyl ester (CME) having ~540 mg/kg saturated monoglycerides therein and an initial CSFBT value of ~1.4 was combined with ~300 ppm(v) Baker Hughes BPR34260H copolymer at about 25° C. The resulting biofuel composition was observed to exhibit a CSFBT of ~1.0.

Example 2

A soybean oil methyl ester (SME) having ~1020 mg/kg saturated monoglycerides therein and an initial CSFBT value of ~2.0 was combined with ~100 ppm(v) Baker Hughes BPR34260H copolymer at about 25° C. The resulting biofuel composition was observed to exhibit a CSFBT of ~1.0.

Example 3

A soybean oil methyl ester (SME) having ~1020 mg/kg saturated monoglycerides therein and an initial CSFBT value of ~2.0 was combined with ~100 ppm(v) Baker Hughes BPR34260H copolymer at about 25° C. The resulting biofuel composition was observed to exhibit a CSFBT of ~1.0.

Example 4

A mixture of the CME of Example 1 and the SME of Example 2, said mixture having an initial CSFBT value of ~1.7, was combined with ~200 ppm(v) Baker Hughes BPR34260H copolymer at about 25° C. The resulting biofuel composition was observed to exhibit a CSFBT of ~1.0.

Example 5

A tallow methyl ester (TME) having ~1080 mg/kg saturated monoglycerides therein and an initial CSFBT value of ~1.7 was combined with ~300 ppm(v) Baker Hughes BPR34260H carboxylic anhydride copolymer at about 25° C. The resulting biofuel composition was observed to exhibit a CSFBT of ~1.0.

Figure 1:
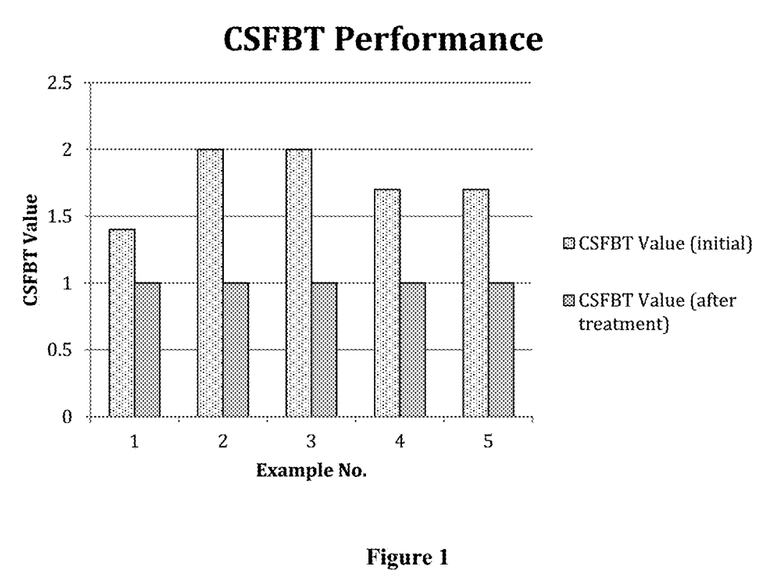
FIG. 1 illustrates the effect of the copolymer on the filter blocking tendency.

Data related to Examples 1-5 is reported in Table 1. FIG. 1 shows that the addition of the carboxylic anhydride copolymer appeared to restore the filter blocking tendency to ~1.0, similar to pure Isopar K.

TABLE 1

Properties of Examples 1-5

| Ex. | Copolymer content (ppm(v)) | Monoglyceride content (mg/kg) | CSFBT (initial) | CSFBT (treated) | CSFBT ratio |
|---|---|---|---|---|---|
| 1 | ~300 | ~540 | ~1.4 | ~1.0 | ~0.71 |
| 2 | ~100 | ~1020 | ~2.0 | ~1.0 | ~0.50 |
| 3 | ~300 | ~1020 | ~2.0 | ~1.0 | ~0.50 |
| 4 | ~200 | — | ~1.7 | ~1.0 | ~0.59 |
| 5 | ~300 | ~1080 | ~1.7 | ~1.0 | ~0.59 |

Example 6

In this control example, ~80 vol % low sulfur diesel, ~3 ppm(v) Stadis™ 450, and ~20 vol % of the SME of Example 2 were combined. The conductivity was measured initially and after 10 days.

Example 7

Example 6 was substantially repeated, except that the composition comprised ~80 vol % low sulfur diesel, ~20 vol % of the SME of Example 2, and ~1500 ppm(v) of the Baker Hughes BPR34260H carboxylic acid anhydride copolymer.

Example 8

Example 6 was substantially repeated, except that the composition comprised ~80 vol % low sulfur diesel, ~3 ppm(v) Stadis™ 450, ~20 vol % of the SME of Example 2, and ~1500 ppm(v) of the Baker Hughes BPR34260H carboxylic acid anhydride copolymer.

Example 9

Example 6 was substantially repeated, except that the composition comprised ~100 vol % low sulfur diesel, but with ~3 ppm(v) Stadis™ 450, and ~300 ppm(v) of the Baker Hughes BPR34260H carboxylic anhydride copolymer.

Figure 2:
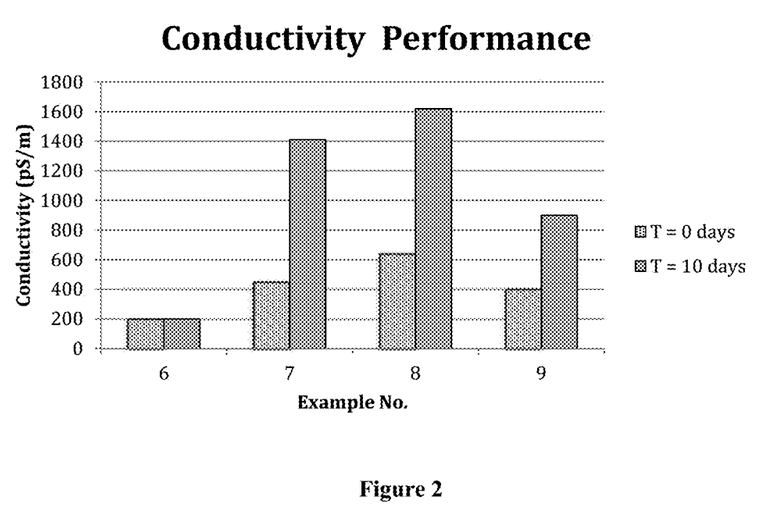
FIG. 2 illustrates the effect of the presence of a conductivity improver on selected biodiesel fuel compositions described herein.

Examples 6-9 appeared to show an unexpected synergistic effect for improving electrical conductivity between the carboxylic acid anhydride copolymer and the conductivity improver Stadis™ 450. Example 6 contained the fuel, the SME, and the conductivity aid, but appeared to show no improvement in conductivity after ~10 days. Example 7 on the other hand had only the fuel, the SME, and the carboxylic anhydride copolymer, but nevertheless appeared to show significant improvement in conductivity after ~10 days. Example 8 had both the conductivity improver and the carboxylic acid anhydride copolymer and appeared to show an improvement greater than what would have been expected from Examples 6 and 7. In other words, it was unexpectedly found that the combination of the carboxylic acid anhydride copolymer in the presence of the SME appeared to increase significantly the conductivity of the fuel. FIG. 2 illustrates the conductivity performance of Examples 6-9.

Figure 3:
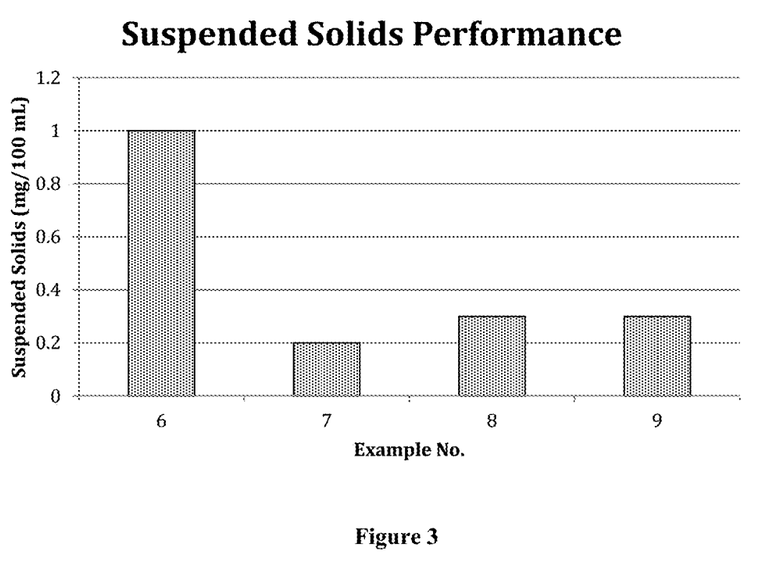
FIG. 3 illustrates suspended solids behavior of selected biodiesel compositions described herein.

Examples 6-9 were tested for suspended solids by allowing the samples to remain at ambient temperature (about 25° C.) for ~10 days. Thereafter, the amount of suspended material was determined according to ASTM D 7321. As FIG. 3 illustrates, there appears to be no significant interaction between the carboxylic acid anhydride copolymer and the conductivity aid. The addition of ~300 ppm(v) BPR34260H appeared to directionally decrease the total suspended sediment of the fuel. Data related to Examples 6-9 are reported in Table 2.

TABLE 2

Properties of Examples 6-9

| Ex. | Diesel fuel (vol %) | SME content (vol %) | Co-polymer content (ppm (v)) | Conductivity aid content (ppm (v)) | Conductivity, T = 0 d (pS/m) | Conductivity, T = 10 d (pS/m) |
|---|---|---|---|---|---|---|
| 6 | ~80 | ~20 | 0 | ~3 | ~200 | ~200 |
| 7 | ~80 | ~20 | ~1500 | ~0 | ~450 | ~1410 |
| 8 | ~80 | ~20 | ~1500 | ~3 | ~640 | ~1620 |
| 9 | 100 | 0 | ~300 | ~3 | ~400 | ~900 |

Conductivity values reported in Table 2 were estimated from FIG. 3.

Conductivity values reported in Table 2 were estimated from FIG. 3.

Examples 10-14

Examples 6-9 were substantially repeated, except that each of the fuel compositions was placed in a recirculation bath at ~4° C. for about 16 hours. After that period, all fuels appeared clear and bright with no visible precipitate of sterol glucoside and saturated monoglycerides.

Examples 15-17

In Example 15, a soybean methyl ester (SME, Fuel 1) having a relatively high CSFBT (~2.7) was additized with ~5000 vppm dipropylene glycol (Fuel 2) and with ~10000 vppm dipropylene glycol (Fuel 3). Each B100 fuel was then blended with Isopar K, made according to CSFBT test method CAN/CGSB-3.524 Appendix A, so as to attain B20 for all fuels (i.e., each fuel was blended as 1 part fuel and 4 parts Isopar K), meaning that the B20 additive concentrations for Fuels 2 and 3 were ~1000 vppm and ~2000 vppm, respectively. Each B20 blend was soaked for ~16 hours at ~1° C. and then brought to ambient temperature. Each pre-soaked B20 fuel blend was then tested according to ASTM D2068 using modified Procedure B (Whatman Puradisc™ 13 mm GF/A 1.6 μm glass microfiber syringe filter). The B20 version of Fuel 1 exhibited a CSFBT of ~2.7. The B20 version of Fuel 2 exhibited a CSFBT of ~3.5. The B20 version of Fuel 3 exhibited a CSFBT of ~1.0.

In Example 16, a different soybean methyl ester (SME, Fuel 4) having a relatively high CSFBT (~3.9) was additized with ~10000 vppm dipropylene glycol (Fuel 5). Each fuel was tested according to ASTM D2068 using modified Procedure B (Whatman Puradisc™ 13 mm GF/A 1.6 μm glass microfiber syringe filter). Fuel 4 exhibited a CSFBT of ~3.9. Fuel 5 exhibited a CSFBT of ~1.0.

In Example 17, Fuel 4 was additized with ~10000 vppm of diethylene glycol monomethyl ether (DEGME) to form Fuel 6. This fuel was tested according to ASTM D2068 using modified Procedure B (Whatman Puradisc™ 13 mm GF/A 1.6 μm glass microfiber syringe filter). Fuel 6 exhibited a CSFBT of ~3.2.

Examples 15-17 show that CSFBT can be improved drastically for feeds containing biocomponent portions, when used in the appropriate proportion of the appropriate additive. For dialkylene glycols such as dipropylene glycol, regardless of whether B20 or B100, a volume/volume ratio of 0.5% did not improve CSFBT (actually worsened it), and a volume/volume ratio of 1.0% did improve CSFBT (all the way to ~1.0). Also, glycol ethers did not appear to work at the same volume/volume ratios as di-hydroxy-functional additives such as dialkylene glycols.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the enforceable scope of the present invention.

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A method of reducing the cold soak filter blocking tendency of a biodiesel fuel composition, comprising:
   providing a biodiesel fuel comprising a biocomponent portion, optionally a non-biocomponent portion, and one or more sterol glucosides and/or one or more monoglycerides, which biodiesel fuel has a CSFBT of at least about 1.4;
   providing a dialkylene glycol additive composition that comprises or is diethylene glycol and/or dipropylene glycol in an amount, relative to an amount of the biocomponent portion, of at least 0.7% and at most 20.0% volume/volume; and
   blending the additive with the biodiesel fuel to form a treated fuel composition, which has a CSFBT from about 1.0 to about 1.3.

2. The method of claim 1, wherein one or more of the following are satisfied: the dialkylene glycol additive is present in an amount, relative to an amount of the biocomponent portion, of at least 1.0% v/v; the one or more sterol glucosides are present in a non-zero amount up to 200 mg/kg; and the one or more monoglycerides are present in a non-zero amount up to 20000 mg/kg.

* * * * *